United States Patent [19]

Rodriguez

[11] 4,439,846
[45] Mar. 27, 1984

[54] SONAR RANGEFINDER SYSTEM

[75] Inventor: Marie T. Rodriguez, Somerville, Mass.

[73] Assignee: Polaroid Corporation, Cambridge, Mass.

[21] Appl. No.: 322,469

[22] Filed: Nov. 18, 1981

[51] Int. Cl.³ .............................................. G01S 15/08
[52] U.S. Cl. ..................... 367/99; 367/108; 367/900
[58] Field of Search ............... 367/108, 112, 900, 99, 367/107, 113, 114

[56] References Cited

U.S. PATENT DOCUMENTS

| | | | |
|---|---|---|---|
| 3,766,518 | 10/1973 | Rilett | 367/112 |
| 3,787,802 | 1/1974 | Brahman | 367/108 X |
| 3,935,514 | 1/1976 | Ellin | 317/80 |
| 4,000,650 | 1/1977 | Snyder | 367/108 X |
| 4,169,255 | 9/1979 | Hulsman et al. | 367/900 X |
| 4,186,371 | 1/1980 | Toubkin et al. | 367/112 X |

Primary Examiner—Richard A. Farley
Attorney, Agent, or Firm—Edward S. Roman

[57] ABSTRACT

An ultrasonic rangefinder system for use in either an ultrasonic rangefinder camera or a general purpose ultrasonic rangefinder designer's kit provides a plurality of automatic sonic rangefinder functions when embodied in the photographic rangefinder camera while at the same time accommodating independently established control functions overriding the automatic functions when the rangefinder is utilized as part of the general purpose sonar rangefinder designer's kit.

10 Claims, 2 Drawing Figures

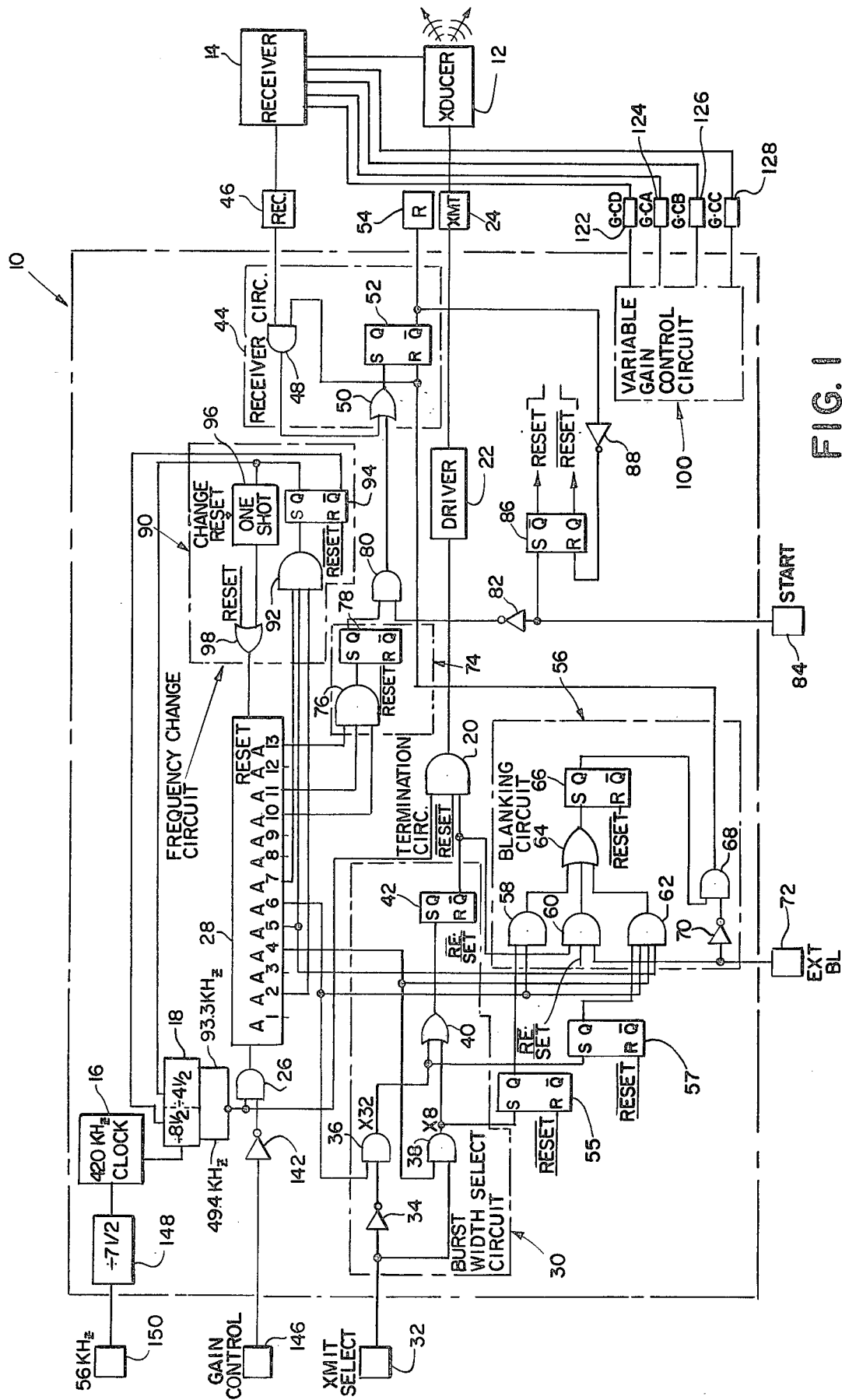

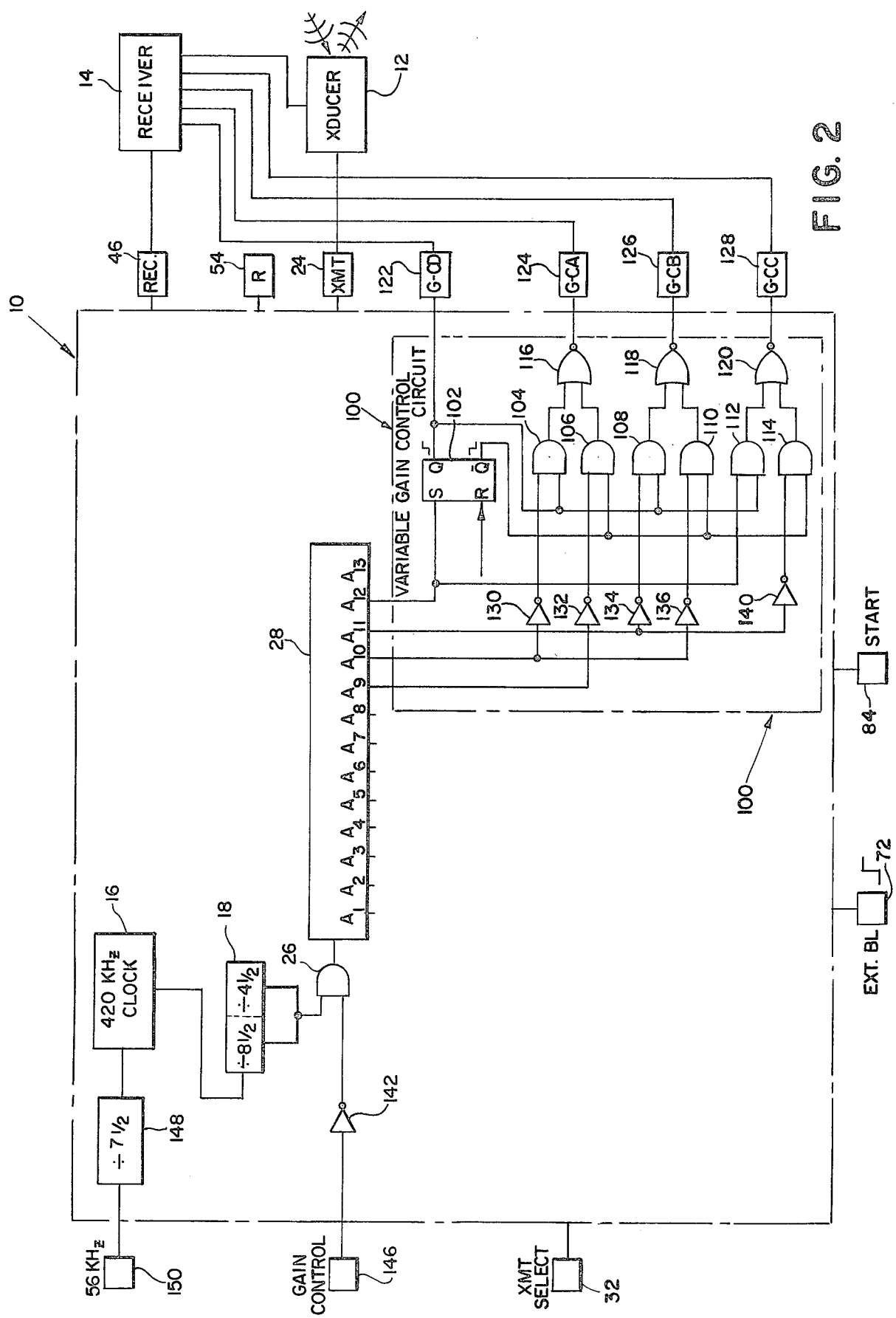

SONAR RANGEFINDER SYSTEM

BACKGROUND OF THE INVENTION

1. Field of the Invention

This invention relates generally to an ultrasonic system and, more particularly, to an ultrasonic system which is compatible for use in either a sonic rangefinder photographic camera or in a general purpose sonic rangefinder designer's kit.

2. Description of the Prior Art

Ultrasonic ranging systems are conventionally used in cameras to effect automatic focusing, in instruments for monitoring liquid level in containers, for proximity detectors, etc. U.S. Pat. No. 4,199,246, entitled "Ultrasonic Ranging System for a Camera," by J. Muggli, issued Apr. 22, 1980, in common assignment herewith and now incorporated by reference herein in its entirety, is an example of an ultrasonic ranging system incorporated into a camera. The system in this patent transmits a burst of sonic energy towards a subject, and the transmit time measured from the burst to receipt of an echo is a measure of the subject range based on the assumption that the speed of sound is a constant.

In the patent referred to above, a single transducer is used to both transmit the sonic energy and to receive echoes. A receiver for processing the output of the transducer is gain and bandwidth controlled and produces a range signal whose duration is proportional to subject range. Proper operation requires the receiver to be blanked both during the transmission of the burst and for a predetermined time thereafter. The latter operation is necessary in order to permit ringing of the transducer to terminate since only after such termination can the output of the receiver be associated with an echo. The time period that the receiver must be blanked depends on such parameters as the duration and power of the burst, etc., and for a 1 millisecond burst about 600 microseconds following the burst is required for the ringing to subside significantly and permit the receiver to begin operation. Thus, for a 1 millisecond burst, the receiver is disabled for about 1.6 milliseconds, with the result that a subject no closer than about 10 inches from the transducer can be detected. While this minimum subject distance is adequate for most camera work, in some instances and in other applications of ultrasonic ranging, detections of subjects closer than 10 inches is desirable.

In order to decrease or vary the effective range of the sonic rangefinder, it is proposed as, for example, in U.S. Pat. No. 4,199,246, supra, that several different pulses could be used, one for each of several different ranges. For example, a short pulse could be used for objects from 10 centimeters to one meter and a second and longer pulse could be used for longer distances. How such a system could be implemented is fully explained in U.S. patent application Ser. No. 296,508.

Polaroid Corporation manufactures and sells both ultrasonic rangefinder cameras and ultrasonic rangefinder designer's kits for general use by engineers in designing a wide variety of systems which utilize sonic rangefinders. The general purpose sonic rangefinder designer kits are highly versatile so as to enable the engineer to integrate the designer's kit into a wide variety of different systems. Thus, the circuitry for the designer's kit must be designed so as to enable the kit user to control a broad variety of functions within the rangefinder that would otherwise be controlled automatically when the rangefinder is utilized in a camera apparatus.

Therefore, it is a primary object of this invention to provide a sonic rangefinder system that is compatible for use in either a sonic rangefinder camera or a general purpose sonic rangefinder designer's kit wherein many of the sonic rangefinding functions which are automatically provided within the camera apparatus may be independently controlled by the user when the sonic rangefinder is utilized in the designer's kit.

It is an even further object of this invention to provide a sonic rangefinder system which may be embodied in a single, digital integrated circuit chip which is compatible for use in either an automatic sonar rangefinder camera or a general purpose sonar rangefinder designer's kit.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

A sonic rangefinder system of the type for use with a transmitter for transmitting a burst of sonic energy toward a subject and a receiver for generating an electronic signal responsive to receipt of an echo from the subject comprises means for generating an electronic signal burst for transmission to the transmitter to provide the burst of sonic energy and means for receiving the electronic signal from the receiver to provide an output range signal representative of the subject distance in accordance with the elapsed time between transmission and reception of the echo signal. Means responsive to an externally applied blanking control signal, which may be selectively controlled by the user of the designer's kit, provides at least one blanking signal for inhibiting the receiver means from providing the output range signal for a selected interval subsequent to the transmission of the sonic burst. Means are included for automatically providing the blanking signal for disabling the receiver means from providing the output range signal for the duration of the burst of sonic energy and for a determinate interval immediately subsequent to the transmission of the burst of sonic energy in the absence of the blanking control signal being provided by the kit user. The blanking means responds to the termination of the blanking control signal provided by the user prior to the termination of the determinate interval by removing the blanking signal to prevent the inhibiting of the receiver.

The sonic rangefinder may additionally include means for providing an infinity termination signal to the receiving means at an elapsed time from the transmission of the sonic burst corresponding to a predetermined subject distance. This operates to cause the receiving means to provide the output range signal regardless of whether it actually receives the electronic signal from the receiver. Gate means which respond to another input control signal from the kit user are provided for blocking the transmission of the infinity termination signal to the receiving means when the kit user wishes to extend the effective range of the sonic rangefinder system beyond the predetermined subject range.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 1 is a schematic circuit diagram for the sonic rangefinder of this invention; and FIG. 2 is a schematic circuit diagram for the sonic rangefinder of FIG. 1 showing one portion thereof in greater detail.

DESCRIPTION OF THE PREFERRED EMBODIMENTS

Referring now to FIG. 1, there is shown at 10 the sonic rangefinder system of this invention which is preferably embodied in a single, digital integrated circuit chip which may be used in either a general purpose sonar rangefinder designer's kit or an automatic sonar rangefinder camera, both of which are manufactured and sold by Polaroid Corporation. The sonic rangefinder system 10 produces an electronic signal burst in a manner to be subsequently described which is applied to a transmitting transducer 12 so as to cause the transducer to produce a matching burst of sonic energy which radiates outwardly from the transducer 12 toward a subject following a pattern which depends upon the configuration of the transducer as explained in U.S. Pat. No. 4,199,246, supra. Any echo from such a burst is thereafter applied through the transducer 12 to a receiver 14 which operates to amplify the echo signal received from the transducer and to apply the amplified echo signal back to the sonic rangefinder system 10 for reasons which will become apparent from the following discussion. Both the transducer 12 and the receiver 14 are located in the sonic rangefinding camera to which the sonic rangefinder system 10 is utilized or, alternatively, may be provided in the general purpose designer's kit in conjunction with the sonic rangefinder system 10.

The sonic rangefinder 10 comprises a clock 16 which provides a 420 kHz output clock pulse to a frequency divide circuit 18 which can be selectively controlled to divide the clock pulse train by either 8½ or 4½ to provide respectively either a 49.4 kHz output pulse train or a 93.3 kHz output pulse train. The output pulse train from the frequency divide circuit 18 is directed to one input terminal of an AND gate 20, the output terminal of which is connected to a driver circuit 22 which, in turn, provides an output signal to a transmit terminal 24 for connection to the transducer 12. Thus, the clock 16 and frequency divide circuit 18 provide a pulse train signal by way of the AND gate 20 and driver circuit 22 to cause the transducer 12 to produce a burst of sonic energy. The output pulse train from the frequency divide circuit 18 is also simultaneously directed to one input terminal of an AND gate 26, the output terminal of which is connected to the input terminal of a binary counter as shown at 28.

The duration of the electronic pulse train signal, i.e., electronic signal burst, provided to the transducer 12 is determined by a burst width select circuit 30 which receives an input electronic burst duration control signal from a transmit select terminal 32. The input control signal from the transmit select terminal 32 is inverted by an inverter gate 34 and thereafter directed to one input terminal of an AND gate 36. The input control signal from the transmit select terminal 32 is also directed to one input terminal of an AND gate 38, the output terminal of which along with the output terminal of the AND gate 36 are connected to respective input terminals of an OR gate 40. The output terminal from the OR gate 40, in turn, is connected to the set terminal of an RS flip-flop 42. The other input terminal to the AND gate 36 receives an assertive output signal from the $A_6$ terminal of the binary counter 28 when the signal at the $A_6$ terminal switches from a low (binary logic 0) level to a high (binary logic 1) level upon the binary counter 28 counting 32 pulses from the pulse train provided by the frequency divide circuit 18. The other input terminal to the AND gate 38 receives an assertive output signal from the $A_4$ terminal of the binary counter 28 when the signal at the $A_6$ terminal switches from a low (binary logic 0) level to a high (binary logic 1) level upon the binary counter 28 counting 8 pulses from the pulse train provided by the frequency divide circuit 18.

Thus, as now becomes readily apparent, the kit user by providing a low (binary logic 0) input signal level to the transmit select terminal 32 can enable the AND gate 36 to switch upon the binary counter 28 counting 32 pulses thereby providing a high (binary logic 1) signal level by way of the OR gate 40 so as to set the RS flip-flop 42 to provide a low (binary logic 0) output signal level from the $\overline{Q}$ terminal thereof. In this manner, the AND gate 20 is enabled to pass 32 pulses of the pulse train received from the frequency divide circuit 18 to the driver 22 so that the electronic signal burst provided to the transducer 12 comprises 32 pulses. Conversely, if the kit user provides a high (binary logic 1) input signal level to the transmit select terminal 32, the AND gate 38 will be enabled to switch when the binary counter 28 counts 8 pulses so as to provide a high (binary logic 1) input signal level by way of the OR gate 40 to the set terminal of the RS flip-flop 42 thereby setting the flip-flop 42 to a low (binary logic 0) output signal level at the $\overline{Q}$ terminal. The AND gate 20 is thus disabled from transmitting any further pulses received from the frequency divide circuit 18. In this manner, the electronic signal burst provided to the transducer 12 is limited to 8 pulses and the user may thus choose between providing an electronic signal burst to the transducer 12 of either 8 pulses or 32 pulses depending upon whether the transmit select terminal 32 receives either a high (binary logic 1) input signal level or a low (binary logic 0) input signal level. The shorter 8 pulse electronic signal burst is preferably used for ranging to shorter subject distances than the subject distances for which the 32 pulse electronic burst would be utilized for reasons which are fully explained in U.S. Pat. No. 4,199,246, supra, and U.S. patent application Ser. No. 296,508.

The sonic rangefinder 10 also includes a receiver circuit 44 which receives the output signal from the receiver 14 by way of an input terminal 46. The input signal to the receiver circuit 44 is directed to one input terminal of an AND gate 48, the output terminal of which is directed to one input terminal of an OR gate 50 from which the output signal is then directed to set an RS flip-flop 52. The output signal from the $\overline{Q}$ terminal of the RS flip-flop 52 is then directed to an output terminal 54 so as to provide an output range signal to the kit user so that he may derive the subject distance in accordance with elapsed time betwen the transmission of the burst of sonic energy and the reception of the echo signal from the subject.

Since a single transducer 2 is utilized for both transmitting a burst of sonic energy and receiving the echo signal, it is necessary to blank the receiver circuit 44 during transmission of the sonic burst and for a short period of time subsequent to the termination of the burst, in order to permit the ringing of the transducer to terminate. The time during which the transducer must be blanked susbsequent to termination of a burst therefrom will depend upon the level of energy in the burst as well as its duration. For a given transducer and level of exitation, blanking for about 500 microseconds following termination of a burst from the transducer is usually adequate to assure complete damping of the ringing of the transducer.

Toward this end, there is provided a blanking circuit 56 comprising three AND gates 58, 60 and 62, all of which provide output signals to respective input terminals of an OR gate 64 which, in turn, provides an output signal to the set terminal of an RS flip-flop 66. The output signal from the Q terminal of the flip-flop 66, in turn, is directed to one input terminal of an AND gate 68 which, in turn, provides an output signal to the other input terminal of the AND gate 48 and the reset terminal of the flip-flop 52 in the receiver circuit 44.

Under conditions where the kit user selects the short electronic signal burst of 8 pulses, as previously discussed, he activates the transmit select terminal 32 with a high (binary logic 1) input signal level so as to, in turn, enable the AND gate 38 to swtich to a high (binary logic 1) output signal level upon the binary counter 28 counting 8 pulses from its input pulse train. The high (binary logic 1) output signal level from the AND gate 38, in turn, operates to set an RS flip-flop 55 so as to provide a high (binary logic 1) output signal level from the Q terminal thereof to one input terminal of the AND gate 58. This enables the AND gate 58 to be the control gate which ultimately determines the duration of the blanking interval in the absence of an external blanking control signal being applied to an input terminal 72 to the blanking circuit 56 for the following reasons.

Thus, if the kit user does not wish to control the duration of the blanking period or, alternatively, if the sonic rangefinder 10 is utilized in a sonar rangefinder camera, there is provided a low (binary logic 0) input signal level to the external blanking terminal 72 which, in turn, is directed to one input terminal of the AND gate 60 so as to disable the AND gate 60 from providing any further control functions. The low (binary logic 0) external blanking signal at the terminal 72 is also inverted by the inverter 70 to provide a high (binary logic 1) input signal level to the AND gate 68 thereby enabling the AND gate 68 to switch upon receipt of a high (binary logic 1) input signal level to its other input terminal. As previously discussed, since the kit user has decided to transmit a short 8 pulse signal burst, the high (binary logic 1) input signal level to the transmit select terminal 32 is inverted by the inverter gate 34 so as to disable the AND gate 36 from switching its output signal level to the set terminal of another RS flip-flop 57. The Q terminal of the RS flip-flop 57 is thereby disabled from switching to a high (binary logic 1) output signal level and the AND gate 62 which receives its input signal from the Q terminal of the RS flip-flop 57 is also disabled from subsequently switching its output signal level to a high (binary logic 0) signal level. Thus, as is now readily apparent, the AND gate 58 is the only AND gate of all the AND gates 58, 60 and 62 enabled to subsequently switch to a high (binary logic 1) output signal level, and thereby controls the duration of the blanking period.

One other input terminal to the AND gate 58 connects to the binary counter output terminal $A_6$ which switches to a high (binary logic 1) output signal level upon the binary counter 28 counting a predetermined number of pulses corresponding to a 500 microsecond delay subsequent to the transmission of the 8 pulse burst. Thus, prior to the expiration of the 500 microsecond delay and subsequent to the transmission of the 8 pulse electronic signal burst, all the AND gates 58, 60 and 62 provide low (binary logic 0) input signal levels to the OR gate 64 which, in turn, provides a low (binary logic 0) output signal level to the set terminal of the RS flip-flop 66. Under these conditions, the Q terminal of the RS flip-flop 66 provides a low (binary logic 0) output signal level, i.e., logic control signal, to the AND gate 68 which, in turn, provides a low (binary logic 0) output signal level to one input terminal of the AND gate 48 and to the reset terminal of the RS flip-flop 52 in the receiver circuit 44. Thus, in this manner the receiver circuit 44 is disabled from transmitting the echo signal from the receiver 14 to the output terminal 54.

At the expiration of the 500 microsecond delay subsequent to the transmission of the 8 pulse signal burst, there is provided a positive (binary logic 1) output signal level at the $A_6$ terminal from the binary counter 28 which operates to switch the AND gate 58 to provide a high (binary logic 1) output signal level to the OR gate 64 which, in turn, switches to provide a high (binary logic 1) input signal level to the set terminal of the RS flip-flop 66. The RS flip-flop 66, in turn, is set to provide a high (binary logic 1) output signal level from the Q terminal thereof to the AND gate 68 so as to switch the output therefrom to a high (binary logic 1) signal level which, in turn, is directed to the receiver circuit 44 so as to enable the AND gate 48 and the RS flip-flop 52 to transmit the echo signal from the receiver 14 to the output terminal 54.

Conversely, if the kit user selects the long 32 pulse signal burst and applies a low (binary logic 0) input signal control level to the transmit select terminal 32, the flip-flop 55 will be disabled from subsequently being set to provide a high (binary logic 1) output signal level to the AND gate 58. The low (binary logic 0) input signal control level to the transmit select terminal 32 is inverted by the inverter 34 to provide a high (binary logic 1) output signal level to the AND gate 36 thereby enabling the AND gate 36 to be subsequently switched upon the output signal level from the $A_6$ terminal of the binary counter switching to a high (binary logic 1) level in correspondence with the binary counter 28 counting 32 pulses from its input pulse train. The high (binary logic 1) output from the AND gate 36 is directed to set the RS flip-flop 57 so as to switch the signal level from the Q terminal thereof to a high (binary logic 1) level and thereby enable the AND gate 62 to be thereafter switched by high (binary logic 1) output signal levels from the $A_4$, $A_5$, $A_6$ terminals of the binary counter 28 as will occur 500 microseconds subsequent to the transmission of the 32 pulse signal burst.

Thus, as previously discussed, prior to the AND gate 62 switching to a positive (binary logic 1) output signal level, there is provided by way of the OR gate 64, RS flip-flop 66 and AND gate 68, a low (binary logic 0) output signal level to the AND gate 48 in the receiver circuit 44 thereby blanking the transmission of any echo signal from the receiver 14 to the output terminal 54. Upon the expiration of the 500 microsecond blanking period, output terminals $A_4$, $A_5$ and $A_6$ of binary counter 28 switch to provide high (binary logic 1) signal levels as as to switch the output signal level from the AND gate 62 to a high (binary logic 1) signal level which is transmitted by the OR gate 64 to set the RS flip-flop 66 and provide a high (binary logic 1) output signal level from the Q terminal thereof to the AND gate 68. The other input terminal to the AND gate 68 is already at a high (binary logic 1) input signal level for the reasons previously discussed. The AND gate 68 will thus switch to provide a high (binary logic 1) output signal level to one input terminal of the AND gate 48 and the reset terminal of the RS flip-flop 52 of the receiver circuit 44. The receiver circuit 44 is thereby enabled to transmit any received echo signals from the receiver 14 to the output terminal 54 subsequent to the 500 microsecond blanking period automatically provided by the blanking circuit 56.

In the event that the kit user wishes to override the previously discussed automatic blanking signal which is required where the sonar rangefinder 10 is utilized in the sonic rangefinder camera, he may provide an external blanking control signal which assumes a high (binary logic 1) output signal level during that period in which he wishes to blank the receiver circuit 44 from transmitting the echo signal from the receiver 14 to the output terminal 54. As will be readily understood, since the signal transducer 12 is utilized to both transmit the burst of sonic energy and to receive the echo signal, it is required that during the period in which the transducer transmits the sonic energy there be provided a blanking signal to the receiver circuit 44 and thus the external blanking control signal must not be provided during the transducer transmit time. The kit user can, however, override the previously discussed automatic 500 microsecond blanking signal subsequent to the transmission of sonic energy. Thus, the application of a positive (binary logic 1) blanking control signal to the external blanking terminal 72 operates to enable the AND gate 60 to switch upon receipt of a high (binary logic 1) input signal level from the $\overline{Q}$ terminal of the RS flip-flop 42 in the pulse width select circuit 30.

Upon transmission of the electronic signal burst, regardless of whether the electronic signal burst comprises 8 or 32 pulses, the RS flip-flop 42 is in reset to provide a high (binary logic 1) output signal level from the $\overline{Q}$ terminal thereof to switch the AND gate 60 to provide a high (binary logic 1) output signal level which, in turn, is directed by way of the OR gate 64 to set the flip-flop 66 so as to provide a high (binary logic 1) output signal level from the Q terminal thereof. This enables the AND gate 68 to switch to a high (binary logic 1) output signal level in response to termination of the external blanking control signal at terminal 72. When the sonic burst is transmitted, the RS flip-flop 66 is set to provide a high (binary logic 1) output signal level to the AND gate 68 thereby enabling the external control blanking signal to control the subsequent duration of the blanking signal by way of the inverter 70 and AND gate 68. Thus, the kit user has complete control of the blanking signal applied to the receiver circuit 44 so long as he is careful not to elminate the blanking signal during the actual time in which the signal burst is being transmitted. This allows the kit user to selectively disregard or blank certain subjects which he may designate and which might be closer to the transducer 12 than other subjects to which he might desire the exact range.

The sonic rangefinder 10 includes an infinity termination circuit 74 for providing the output range signal at output terminal 54 at an elapsed time from transmission of the range signal corresponding to a predetermined subject distance regardless of whether an echo signal is actually received by the receiver 14. The termination circuit 74 is required when the sonic rangefinder 10 is utilized in a sonic rangefinder camera in order to focus the lens at a desired infinity focal position corresponding to a maximum camera-to-subject range which may be in the order of 35 feet. The termination circuit 74 comprises an AND gate 76 which receives output signals from binary counter terminals $A_{10}$, $A_{11}$, and $A_{13}$ which all switch to provide high (binary logic 1) output signal levels to the AND gate 76 upon the binary counter 28 counting a predetermined number of pulses at an elapsed time from transmission of the sonar ranging signal corresponding to a subject range of 35 feet. The output from the AND gate 76, in turn, is directed to the set terminal of an RS flip-flop 78 from which the output signal at the Q terminal thereof is directed to one input terminal of an AND gate 80. The output signal from the AND gate 80 is thereafter directed to the other input terminal of the OR gate 50 in the receiver circuit 44. Thus, prior to the AND gate 76 being switched by the binary counter 28, the RS flip-flop 78 provides a low (binary logic 0) output signal level from its Q terminal so as to disable the AND gate 80 from subsequently switching to provide the set signal to the RS flip-flop 52 and thus the output range signal at output terminal 54.

The kit user can start the transmission of the burst of sonic energy by applying a positive (binary logic 1) input starting pulse to a start terminal 84 so as to set an RS flip-flop 86 and thereby provide the requisite $\overline{\text{reset}}$ and reset signals to the various flip-flops as well as to the binary counter 28. As is readily apparent, when the receiver circuit 44 provides the output range signal at output terminal 54, the signal is inverted by inverter gate 88 and directed to the reset terminal of the RS flip-flop 86 so as to reset the flip-flop 86 in readiness for the user to transmit a subsequent sonic ranging signal. In addition, a positive (binary logic 1) start signal at the input terminal 84 is inverted by an inverter gate 82 to disable the AND gate 80 from transmitting the termination signal, as previously described. Thus, if the kit user wishes to extend the effective range of the sonic rangefinder 10 beyond the 35 feet to which it is limited by the termination circuit 74, he need only increase the duration of the positive (binary logic 1) input start signal at the terminal 84 for the desired length of time in which he wishes to disable the AND gate 80 from switching as a result of the termination control signal. In the event that the kit user does not receive an echo signal when he extends the range, he must then apply a low (binary logic 0) signal level to the output terminal 54 to reset the RS flip-flop 86 in order to ready the system for a subsequent transmission of the sonic ranging signal.

The frequency divide circuit 18 is preferably controlled to switch from its divide by 8½ function which provides the 49.4 kHz output pulse train to a divide by 4½ function which provides the 93.3 kHz output pulse train after the binary counter 28 counts 82 pulses. This control function is provided by a frequency change circuit as shown at 90 which comprises AND gate 92 connected to receive input signals from the binary counter's $A_2$, $A_5$, and $A_7$ terminals which all change to positive (binary logic 1) output signal levels upon the input pulse count reaching 82. The output from the AND gate 92 is directed to the set terminal of an RS flip-flop 94 which provides output signals from the Q and $\overline{Q}$ terminals thereof, respectively, to control the mode of operation of the frequency divide circuit 18 in a well-known manner. In addition, the output from the Q terminal of the RS flip-flop 94 is directed to a monostable multivibrator 96 which provides a reset pulse by way of an OR gate 98 to the binary counter 28 so as to reset the counter back to a 0 binary count in synchronism with the changeover in the input pulse train frequency from 49.4 kHz to 93.3 kHz. In this manner, the counter 28 is enabled subsequent to the transmission of the sonar ranging signal to again start counting the increased frequency pulse train in a manner for better controlling the variable gain signal provided by a variable gain control circuit as best shown in FIG. 2.

The clock 16 also provides the 420 kHz clock pulse to another frequency divide circuit 148 which operates to divide the 420 kHz clock pulse by $7\frac{1}{2}$ to provide a 56 kHz output pulse train to an output terminal 150 for use by the kit user for timing the subject range between transmission of the sonar ranging signal by the transducer 12 and provision of the range signal upon echo receipt at the output terminal 54. The 56 kHz pulse train output at terminal 150 is particularly convenient for this timing function since 100 pulses correspond to one foot of subject range.

Referring now to FIG. 2, there are shown the details of the variable gain control circuit 100 which provides variable gain control signals at output terminals 122, 124, 126 and 128 for controlling the gain of the receiver 14 in a manner as is more fully explained in U.S. Pat. No. 4,199,246, supra, in order to increase the signal-to-noise ratio for subjects at increasing distances from the transducer 12. The variable gain control circuit 100 comprises an RS flip-flop 102 which provides at the Q terminal thereof an output signal to one input terminal of each of three AND gates 104, 108 and 112. The $\overline{Q}$ terminal from the RS flip-flop 102 provides an output signal to one input terminal of each of three AND gates 106, 110 and 114. The other input terminals to the AND gates 104 and 110 receive input signals which are inverted respectively by inverter gates 130 and 136 from terminal $A_{10}$ of the binary counter 28. The other input terminal to the AND gate 106 receives an input signal inverted by an inverter gate 132 from terminal $A_9$ of the binary counter 28. The other input terminals to AND gates 108 and 114 receive input signals which are inverted respectively by inverted gates 134 and 140 from terminal $A_{11}$ of the binary counter 28 while the other input terminal to AND gate 112 receives an input signal from the output terminal $A_{12}$ of the binary counter 28. The output terminals from AND gates 104 and 106 are connected respectively to the input terminals of a NOR gate 116 which provides one gain control signal to the terminal 124. The output terminals from AND gates 108 and 110, in turn, connect respectively to the input terminals of another NOR gate 118 which provides another gain control signal to the terminal 126. Finally, the output terminals from AND gates 112 and 114, in turn, connect respectively to the input terminals of still another NOR gate 120 which provides still another gain control signal to the terminal 128.

Immediately subsequent to transmission of the range signal, the output signal level at terminal $A_{12}$ of the binary counter 28 is at a low (binary logic 0) signal level so that the RS flip-flop 102 provides a high (binary logic 1) output signal level from the $\overline{Q}$ terminal thereof and a low (binary logic 0) output signal level from the Q terminal thereof. Thus, the RS flip-flop 102 enables the AND gates 106, 110 and 114 to provide the respective frequency gain control signals to the output terminals 124, 126 and 128 while simultaneously disabling the AND gates 104, 108 and 112 from providing any control function. Whereas the AND gate 106 is controlled from the $A_9$ terminal of the binary counter 28 and the AND gate 110 is controlled from the $A_{10}$ terminal of the binary counter 28, it becomes immediately apparent that the frequency of the output gain control signal at terminal 124 is twice that of the frequency of the output gain control signal at output terminal 126. In like manner, whereas the AND gate 110 is controlled by the output signal from the binary counter terminal $A_{10}$ and the AND gate 114 is controlled by the output signal from the terminal $A_{11}$ of binary counter 28, it becomes readily apparent that the frequency of the output gain control signal at terminal 126 is twice that of the frequency of the output gain control signal at terminal 128.

Twenty milliseconds subsequent to the transmission of the echo signal by the transducer 12, the output signal at terminal $A_{12}$ switches from a low (binary logic 0) level to a high (binary logic 1) level to set the flip-flop 102 and thereby switch the output signal level at the $\overline{Q}$ terminal thereof to a low (binary logic 0) signal level while simultaneously switching the signal level at the Q terminal thereof to a high (binary logic 1) signal level. Thus, setting flip-flop 102 operates to disable the AND gates 106, 110 and 114 while simultaneously enabling the AND gates 104, 108 and 112 to provide the gain control signals.

As becomes readily apparent, since the AND gate 104 now receives its input control signal from the $A_{10}$ terminal of the binary counter 28, the frequency of the output control gain signal at terminal 124 will be half of what it was previous to the setting of the RS flip-flop 102. In like manner, since the AND gate 108 now receives its input control signal from terminal $A_{11}$ of the binary counter 28, the frequency of the output gain control signal at terminal 126 will also be half of what it was previous to the setting of RS flip-flop 102; and, since the AND gate 112 now receives its input control signal from the $A_{12}$ terminal of the binary counter 28, the frequency of the output control gain signal at terminal 128 will also be half of what it was previous to the setting of RS flip-flop 102. Thus, 20 milliseconds subsequent to the transmission of the echo sonar signal the frequency of the gain control signals at output terminals 124, 126 and 128 are simultaneously halved while maintaining the same corresponding relationship with respect to each other.

In the event that the kit user now wishes to extend the range of the sonar rangefinder 10 in the previously described manner by extending the duration of the high (binary logic 1) start signal level, he may also wish to simultaneously stop the variation in the gain control signal to the receiver 14 at the value which will ensure the highest gain. Toward this end, there is provided a gain control terminal 146 to which the kit user may apply a high (binary logic 1) input signal control level which is subsequently inverted by an inverter gate 142 to disable the AND gate 26 from further inputting the pulse train from the divide circuit 18 to the binary counter 28. Thus, the variable gain control circuit 100 which, as previously discussed, varies the gain control signal as a function of the output from the binary counter 28 is inhibited in this manner from providing further variation in the gain control signal to the receiver 14. The kit user may therefore set the gain at the maximum level when he wishes to extend the range of the sonar rangefinder beyond the 35 foot limit automatically provided by the termination circuit 74.

Thus, there is provided a sonar rangefinder which is compatible for use in either a sonic rangefinder camera or a general purpose sonar rangefinder designer's kit, both of which are sold by Polaroid Corporation. The sonar rangefinder of this invention automatically provides a blanking signal during the duration of the transmission of the burst of sonic energy and for a predetermined period thereafter in order to assure a complete damping of the ringing of the transducer. The sonar rangefinder further allows the kit user to select one of two sonic bursts of different duration for ranging to different subject distances. The kit user may additionally selectively control the blanking signal provided by the sonar rangefinder in a manner whereby he may override the automatic blanking signal provided subsequent to the transmission of the sonar ranging signal so as to selectively blank echoes received from particular subjects which the user might like to disregard.

The sonar rangefinder of this invention also provides a termination signal for limiting the range in which a subject is detected so that when the sonar rangefinder is utilized in a sonic rangefinding camera, the lens may be rapidly set to an infinity focal position for the photographic subject when the photographic subject is located beyond the maximum predetermined range. The range termination signal, however, can be selectively overriden by the kit user in the event that he may wish to extend the effective range of the sonar rangefinder.

The sonar rangefinder may additionally provide for a variable gain control signal which operates generally to increase the gain of a receiver in correspondence with increasing subject distances. The kit user, when extending the effective range of the sonar rangefinder, may also disable the variable gain control so as to maintain a maximum gain control signal to the receiver for the duration of the ranging operation.

Other embodiments of the invention including additions, subtractions, deletions and other modifications of the preferred disclosed embodiments of the invention will be obvious to those skilled in the art and are within the scope of the following claims.

What is claimed is:

1. A sonic rangefinder system for use with a transmitter for transmitting a burst of sonic energy toward a subject and a receiver for generating an electronic signal responsive to receipt of an echo from the subject comprising:

means for generating an electronic signal burst for transmission to the transmitter to provide the burst of sonic energy;

means for receiving the electronic signal from the receiver so as to provide an output range signal representative of the subject distance in accordance with the elapsed time between transmission and reception of the echo signal; and selectively controllable blanking means responsive to an input control blanking signal generated externally thereof for providing at least one blanking signal for inhibiting said receiver means from providing said output range signal for a selected interval subsequent to the transmission of said burst of sonic energy, said blanking means also operating to automatically provide said blanking signal to inhibit said receiver means from providing said output range signal for the duration of the burst of sonic energy and for a determinate interval immediately subsequent to the transmission of the burst of sonic energy in the absence of the blanking control signal wherein said blanking means responds to the termination of the blanking control signal prior to the termination of said determinate interval by removing said blanking signal to prevent the inhibiting of said receiver means.

2. The sonic rangefinder of claim 1 wherein said signal generating means comprises an electronic clock for generating a pulse train signal, a binary counter for counting the individual pulses of said pulse train signal, and gate control means responsive to said binary counter counting a first predetermined number of pulses for inhibiting further transmission of said pulse train signal to the transmitter such that said electronic signal burst comprises said first predetermined number of pulses, and wherein said blanking means comprises a first gating means for providing a logic control signal during the transmission of the burst of sonic energy and during said determinate interval immediately subsequent to the transmission of the burst of sonic energy and thereafter responding to said binary counter counting a second number of pulses for terminating said logic control signal output from said first gating means and second gating means responsive to either said input control blanking signal or said logic control signal for providing said blanking signal to disable said receiving means, said input control blanking signal also enabling said first gate means to remove its said logic control signal at the beginning of the transmission of the burst of sonic energy thereby enabling said input control blanking signal to determine the duration of said disabling blanking signal to said receiving means.

3. The sonic rangefinder of claim 2 wherein said first gating means includes a first gate responsive to said binary counter counting said second number of pulses for effecting the termination of said logic control signal and a second gate responsive to said input control blanking signal for effecting the termination of said logic control signal at the beginning of the transmission of said electronic signal burst regardless of the output condition from said first gate.

4. The sonic rangefinder of claim 1 wherein said means for generating an electronic signal burst is selectively controllable to provide either one of two electronic signal bursts of different duration and wherein said blanking means provides said blanking signal for inhibiting said receiver means from providing said output range signal for the duration of the electronic signal burst so transmitted and for said determinate interval immediately subsequent to that electronic signal burst so transmitted in the absence of said blanking signal.

5. The sonic rangefinder of claim 4 wherein said blanking means responds to the termination of said blanking control signal prior to the termination of said determinate interval immediately subsequent to that one electronic signal burst so transmitted by removing said blanking signal to prevent the inhibiting of said receiver means.

6. The sonic rangefinder of claim 5 wherein said signal generating means comprises an electronic clock for generating a pulse train signal, a binary counter for counting the individual pulses of said pulse train signal, and selectively actuatable gate control means responsive to said binary counter counting a selected one of at least two numbers of pulses for inhibiting further transmission of said pulse train signal to the transmitter such that said electronic signal burst comprises said selected number of pulses, and wherein said blanking means comprises a first gating means for providing a logic control signal during the transmission of the burst of sonic energy and during said determinate interval immediately subsequent to the transmission of the burst of sonic energy and thereafter responding to said binary counter counting that one of at least two other determined number of pulses occurring at said determinate time interval subsequent to said selected number of pulses for terminating said logic control signal output from said first gating means and second gating means responsive to either said input control blanking signal or said logic control signal for providing said blanking signal to disable said receiving means, said input control blanking signal also enabling said first gate means to remove its said logic control signal at the beginning of the transmission of the burst of sonic energy thereby enabling said input control blanking signal to determine the duration of said disabling blanking signal to said receiving means.

7. The sonic rangefinder of claim 6 wherein said first gating means includes first and second gates cooperatively arranged to respond to said binary counter counting said one number of pulses occurring at said determinate time interval subsequent to said selected number of pulses by effecting the termination of said logic control signal and a third gate responsive to said input control blanking signal for effecting the termination of said logic control signal at the beginning of the transmission of said electronic signal burst regardless of the output conditions from said first and second gates.

8. A sonic rangefinder system for use with a transmitter for transmitting a burst of sonic energy toward a subject and a receiver for generating an electronic signal responsive to receipt of an echo from the subject comprising:

means responsive to a start signal of selectively controllable duration generated externally of said sonic rangefinder system, for generating an electronic signal burst for transmission to the transmitter to provide the burst of sonic energy;

means for receiving the electronic signal from the receiver so as to provide an output range signal representative of the subject distance in accordance with the elapsed time between transmission and reception of the echo signal;

means for providing an infinity termination signal to said receiving means at an elapsed time from transmission of the range signal corresponding to a predetermined subject distance so as to cause said receiving means to provide said output range signal regardless of whether it receives said electronic signal from the receiver; and gate means responsive to said start signal for blocking the transmission of said infinity termination signal to said receiving means when the duration of said start signal is extended to coincide with the elapsed time at which said infinity termination signal is provided in order to extend the effective range of said sonic rangefinder system beyond said predetermined subject distance.

9. The sonic rangefinder system of claim 8 wherein the receiver includes a variable gain amplifier and wherein said sonic rangefinder system includes means for providing a varying gain control output signal to the receiver for incrementally increasing the gain in correspondence with increasing elapsed time from transmission of the range signal and selectively actuatable means for stopping the variation in the gain control signal at a selected gain.

10. The sonic rangefinder of claim 9 wherein said signal generating means comprises an electronic clock for generating a pulse train signal, a binary counter for counting the individual pulses of said pulse train signal and gate control means responsive to said binary counter counting a predetermined number of pulses for inhibiting further transmission of said pulse train signal to the transmitter such that said electronic signal burst comprises said predetermined number of pulses, and wherein said gain control means includes a plurality of gates cooperatively connected with respect to each other to provide a plurality of output gain control signals of varying frequencies as a function of the pulse count output from said binary counter wherein said selectively actuatable means for stopping the variation in the gain control signal operates to inhibit the input of said pulse train signal to said binary counter.

* * * * *